UNITED STATES PATENT OFFICE.

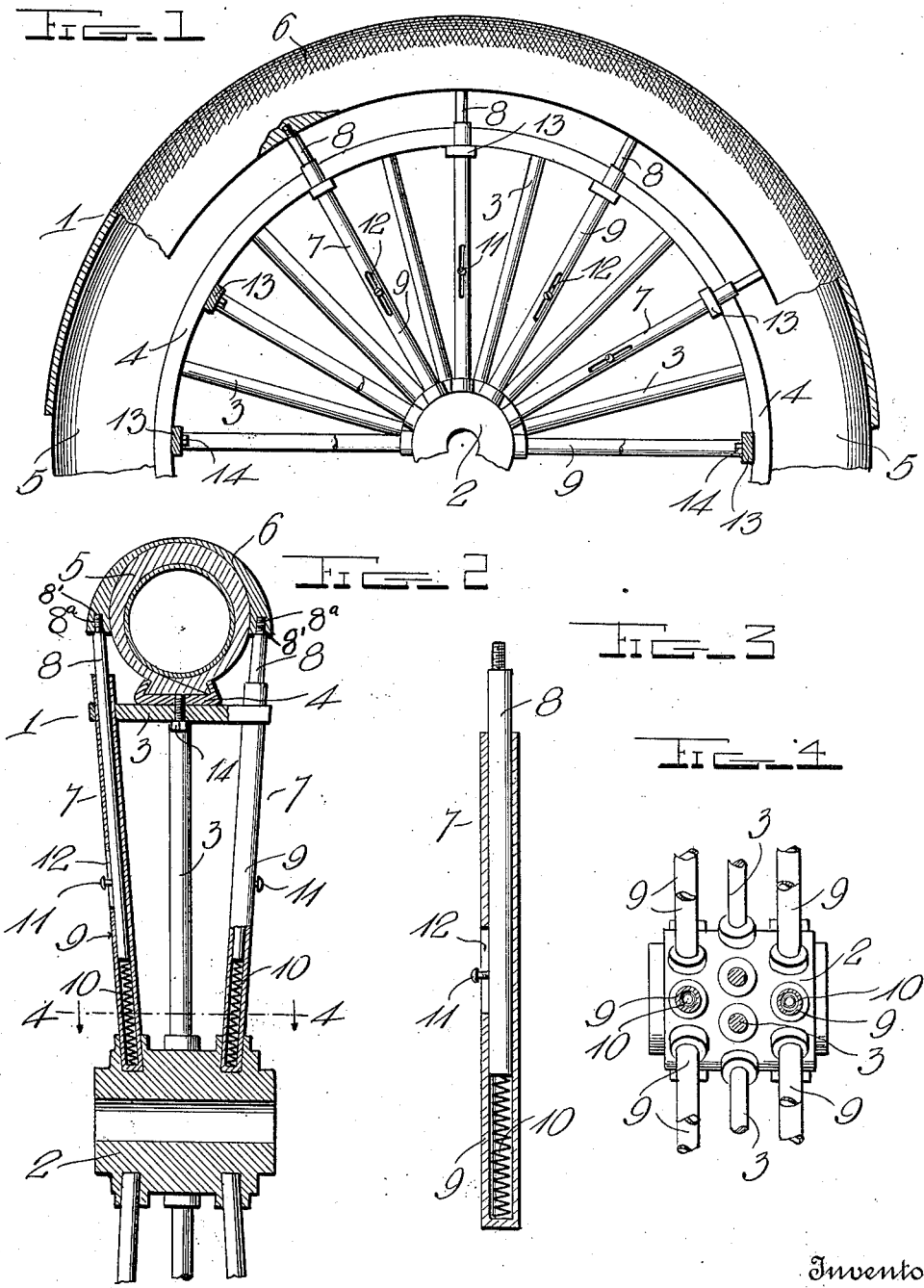

ERLE THWEATH CLARK, OF COMANCHE, OKLAHOMA.

PROTECTOR FOR PNEUMATIC TIRES.

997,752.  Specification of Letters Patent. Patented July 11, 1911.

Application filed August 15, 1910. Serial No. 577,367.

*To all whom it may concern:*

Be it known that I, ERLE T. CLARK, a citizen of the United States, residing at Comanche, in the county of Stephens and State of Oklahoma, have invented certain new and useful Improvements in Protectors for Pneumatic Tires; and I do declare the following to be a full, clear, and exact description of the invention, such as will enable others skilled in the art to which it appertains to make and use the same.

This invention relates to improvements in protectors for pneumatic tired wheels.

One object of the invention is to provide an improved construction of tire protector, which, when applied to a wheel will positively prevent the puncturing of the tire without in any way interfering with the cushioning qualities of the tire, and which will yieldingly support the weight of the vehicle when the tire is in a deflated condition.

With these and other objects in view, the invention consists of certain novel features of construction, combination and arrangement of parts as will be more fully described and particularly pointed out in the appended claims.

In the accompanying drawings: Figure 1 is a side view of a wheel illustrating the application of the invention, parts of the latter being shown in section; Fig. 2 is a vertical sectional view through the hub and one side of the rim and tire of the wheel, and through the protector taken between two of the wheel spokes; Fig. 3 is an enlarged longitudinal sectional view through one of the attaching spokes of the protector; Fig. 4 is a detail cross sectional view on the line 4—4 of Fig. 2 looking in the direction of the arrow.

Referring more particularly to the drawings 1 denotes a vehicle wheel which may be of any desired construction and is here shown as consisting of the hub 2, spokes 3, rim 4 and pneumatic tire 5.

My improved protector comprises a protecting band 6 which is formed of thin sheet metal curved transversely to fit the curvature or tread portion of the pneumatic tire with which the same is engaged. The opposite edges of the protecting band 6 are connected at intervals to the outer ends of a series of attaching arms 7 which are arranged on opposite sides of the wheel and which consist of telescoping sections 8 and 9. The sections 8 are screwed at their outer ends into the opposite edges of the protecting rim 6 and are slidably engaged with or telescope into the tubular sections 9 which are secured at their inner ends to the hub 2 on opposite sides of the wheel spokes in any suitable manner.

In the inner ends of the hollow members of the attaching arms are arranged coiled cushioning springs 10 with which the inner ends of the members 8 of the arms are engaged and whereby said sections and the protecting band 6 are yieldingly held in engagement with the pneumatic tire of the wheel. The members of the arms are loosely connected together to permit their relative movement against the tension of the springs 10 by means of a stop screw 11 which is screwed through a threaded aperture in one side of the member 8 and engages a slot or elongated aperture 12 in the adjacent portion of the hollow member as shown.

The protector attaching arms 7 are secured and braced at their outer ends by clips 13 which are arranged transversely through the wheel between the wheel spokes 3 and are secured at their outer ends to the adjacent attaching arms in any suitable manner. The clips 13 are provided with apertures with which are engaged fastening screws 14 which are screwed into engagement with threaded sockets formed in the inner side of the rim 4 of the wheel.

By thus constructing and arranging the attaching arms 7 for the protector, it will be seen that the inner members of the same form sockets with which the outer members are engaged and by means of the springs 10 in said inner sections the outer sections are yieldingly supported and hold the protecting band in yielding engagement with the pneumatic tire. The protecting band being formed of thin flexible metal and yieldingly supported in the manner described will readily give under pressure, so that the cushioning quality of the pneumatic tire is not affected, while the puncturing of the tire is effectually prevented. Should the pneumatic tire become deflated from any cause, the yieldingly supported protecting band will remove the weight of the vehicle from the tire, thus preventing the rim of the wheel from cutting the tire. Should it be desired to remove the tire 5 from the wheel the threaded ends 8' of the sections 8 of the arms 7 can be conveniently detached from the sockets 8ª in the sides of the band 6 and the latter wholly removed from the wheel, after which, the sections 8 at one side of the wheel can be manually depressed into the socket sections 9 and held in such depressed positions by adjusting the screws 11. After this operation the tire can be readily slipped from the side of the wheel.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. In a tire protector for vehicle wheels, a protecting band embracing the tread portion of the tire and provided at its sides with threaded sockets, and telescopic inner and outer members yieldingly connected with each other, the inner members being secured at their inner ends to the hub of the wheel and the outer members being threaded and detachably engaged in the sockets of the band.

2. In a tire protector for vehicle wheels, a protecting band of spring sheet material embracing the tread portion of the tire, clips secured to the rim of the wheel and provided with apertured ends, hollow members having their inner ends secured to the hub of the wheel and having their outer ends extended through the apertures in the said clips, and members yieldingly mounted in the hollow members and provided with portions extended beyond the members and having detachable engagement with the band.

In testimony whereof I have hereunto set my hand in presence of two subscribing witnesses.

ERLE THWEATH CLARK.

Witnesses:
  G. A. KINCAID,
  S. O. WHITE.

---

Copies of this patent may be obtained for five cents each, by addressing the "Commissioner of Patents, Washington, D. C."